United States Patent
Kwatra et al.

(10) Patent No.: US 11,741,177 B2
(45) Date of Patent: Aug. 29, 2023

(54) ENTITY VALIDATION OF A CONTENT ORIGINATOR

(71) Applicant: INTERNATIONAL BUSINESS MACHINES CORPORATION, Armonk, NY (US)

(72) Inventors: Shikhar Kwatra, San Jose, CA (US); Jeremy R. Fox, Georgetown, TX (US); Raghuveer Prasad Nagar, Kota (IN); Sidharth Ullal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 17/249,484

(22) Filed: Mar. 3, 2021

(65) Prior Publication Data
US 2022/0284069 A1     Sep. 8, 2022

(51) Int. Cl.
| | |
|---|---|
| G06F 16/00 | (2019.01) |
| G06F 16/9536 | (2019.01) |
| G06F 40/289 | (2020.01) |
| G06F 16/909 | (2019.01) |
| H04L 9/40 | (2022.01) |

(Continued)

(52) U.S. Cl.
CPC ........ *G06F 16/9536* (2019.01); *G06F 16/908* (2019.01); *G06F 16/909* (2019.01); *G06F 16/9537* (2019.01); *G06F 40/289* (2020.01); *H04L 63/126* (2013.01)

(58) Field of Classification Search
CPC .................. G06F 16/908; G06F 16/909; G06F 16/9536; G06F 16/9537
USPC ............................................................. 707/734
See application file for complete search history.

(56) References Cited

U.S. PATENT DOCUMENTS

| | | | | |
|---|---|---|---|---|
| 6,826,596 B1 * | 11/2004 | Suzuki | ................... | H04L 51/00 709/204 |
| 8,768,782 B1 * | 7/2014 | Myslinski | ............. | G06F 16/284 705/26.1 |
| 9,053,416 B1 * | 6/2015 | De Leo | ................... | G06N 7/01 |

(Continued)

OTHER PUBLICATIONS

Anonymously, "Autonomous Model Learning System for Model Based Solutions in Ndustrial Plants", IPCOM000264030D, Nov. 2, 2020, pp. 1-5.

(Continued)

*Primary Examiner* — Mariela Reyes
*Assistant Examiner* — Rezwanul Mahmood
(74) *Attorney, Agent, or Firm* — Tihon Poltavets

(57) ABSTRACT

A method for entity validation of a content originator includes identifying a content post in a public forum viewable by a user, where an entity claims to be an originator of the content post. The method also includes, responsive to gathering metadata for the content post, determining, utilizing natural language processing and a classification algorithm, a topic for the content post based on a plurality of extracted words from the content post. The method also includes identifying a plurality of similar content posts relative to the content post based on the topic and the entity and determining a score for the entity claiming to be the originator of the content post, where the score represents a likelihood that the claimed entity is the originator of the content post. The method also includes, responsive to the score being below a verification threshold value, performing ameliorative actions on the content post.

18 Claims, 6 Drawing Sheets

(51) Int. Cl.
  *G06F 16/908* (2019.01)
  *G06F 16/9537* (2019.01)

(56) References Cited

U.S. PATENT DOCUMENTS

| | | | | |
|---|---|---|---|---|
| 9,483,159 | B2* | 11/2016 | Myslinski | G06Q 30/02 |
| 10,162,900 | B1* | 12/2018 | Chatterjee | G06F 16/334 |
| 10,387,574 | B1* | 8/2019 | Anders | G06F 40/44 |
| 10,437,965 | B2* | 10/2019 | Leske | H04L 65/765 |
| 10,462,080 | B1* | 10/2019 | Jones | G06F 16/906 |
| 10,467,310 | B1* | 11/2019 | Dey | H04L 63/102 |
| 10,776,086 | B2 | 9/2020 | Seetharaman | |
| 11,017,426 | B1* | 5/2021 | Garg | G06Q 30/0244 |
| 11,025,642 | B1* | 6/2021 | Jezorek | H04L 9/0643 |
| 11,042,540 | B2* | 6/2021 | Danyluk | G06F 16/3344 |
| 11,049,206 | B1* | 6/2021 | Schneider | G06Q 50/184 |
| 11,087,334 | B1* | 8/2021 | McEachern | H04L 51/046 |
| 11,095,601 | B1* | 8/2021 | Wilson | G06Q 50/01 |
| 11,204,959 | B1* | 12/2021 | Boyd | G06F 16/71 |
| 11,227,248 | B2* | 1/2022 | Wilson | G06N 5/025 |
| 11,282,509 | B1* | 3/2022 | Li | G06F 16/65 |
| 11,294,974 | B1* | 4/2022 | Shukla | G06F 16/90335 |
| 11,316,818 | B1* | 4/2022 | Nagar | H04L 51/063 |
| 11,317,154 | B1* | 4/2022 | Richter | H04N 21/4667 |
| 11,321,153 | B1* | 5/2022 | Kwatra | G06F 7/26 |
| 11,405,349 | B1* | 8/2022 | Veeramuthu | H04L 51/212 |
| 2002/0049738 | A1* | 4/2002 | Epstein | G06F 16/951 |
| 2004/0172415 | A1* | 9/2004 | Messina | G06F 16/951 |
| 2008/0155701 | A1* | 6/2008 | Martinez | G06F 21/10 |
| | | | | 726/27 |
| 2009/0049560 | A1* | 2/2009 | Lotspiech | G09C 5/00 |
| | | | | 726/32 |
| 2009/0157667 | A1* | 6/2009 | Brougher | G06Q 10/063112 |
| | | | | 707/999.005 |
| 2012/0226579 | A1* | 9/2012 | Ha | G06Q 30/02 |
| | | | | 705/26.35 |
| 2012/0272160 | A1 | 10/2012 | Spivack | |
| 2013/0097176 | A1* | 4/2013 | Khader | G06Q 30/0251 |
| | | | | 707/748 |
| 2013/0151240 | A1* | 6/2013 | Myslinski | G06F 40/00 |
| | | | | 704/9 |
| 2013/0158984 | A1* | 6/2013 | Myslinski | A63F 13/828 |
| | | | | 704/9 |
| 2013/0159127 | A1* | 6/2013 | Myslinski | G06Q 30/00 |
| | | | | 705/26.1 |
| 2013/0166914 | A1* | 6/2013 | Vandervort | H04L 63/123 |
| | | | | 713/176 |
| 2013/0198196 | A1* | 8/2013 | Myslinski | G06Q 50/01 |
| | | | | 707/758 |
| 2013/0282504 | A1* | 10/2013 | Lessin | H04L 51/52 |
| | | | | 705/26.1 |
| 2014/0164994 | A1* | 6/2014 | Myslinski | G06F 3/04817 |
| | | | | 715/808 |
| 2014/0172989 | A1* | 6/2014 | Rubinstein | H04L 51/212 |
| | | | | 709/206 |
| 2015/0039749 | A1* | 2/2015 | Kwan | H04L 43/067 |
| | | | | 709/224 |
| 2015/0089671 | A1* | 3/2015 | Brunn | G06F 16/24 |
| | | | | 726/28 |
| 2015/0248405 | A1* | 9/2015 | Rudich | G06F 16/93 |
| | | | | 707/608 |
| 2015/0356684 | A1* | 12/2015 | Taylor, Jr. | G06Q 40/06 |
| | | | | 705/36 R |
| 2016/0035230 | A1* | 2/2016 | Spaulding | H04L 67/535 |
| | | | | 434/236 |
| 2016/0189556 | A1* | 6/2016 | Clark | G09B 7/02 |
| | | | | 434/362 |
| 2016/0294753 | A1* | 10/2016 | Centner | H04L 51/212 |
| 2017/0091785 | A1* | 3/2017 | Arangali Raghavan | |
| | | | | G06F 16/215 |
| 2017/0124303 | A1* | 5/2017 | Baldwin | G06F 21/10 |
| 2017/0134406 | A1* | 5/2017 | Guo | H04L 63/123 |
| 2017/0140051 | A1* | 5/2017 | Ball | G06F 16/358 |
| 2017/0142044 | A1* | 5/2017 | Ball | H04L 51/52 |
| 2017/0193075 | A1* | 7/2017 | Hegelich | G06Q 30/0201 |
| 2017/0235836 | A1* | 8/2017 | Wang | G06Q 50/01 |
| | | | | 707/730 |
| 2017/0277740 | A1* | 9/2017 | Ghotbi | H04L 51/42 |
| 2017/0277755 | A1* | 9/2017 | Bahl | G06Q 30/0201 |
| 2017/0316519 | A1* | 11/2017 | Wang | G06N 20/00 |
| 2017/0357782 | A1* | 12/2017 | Leske | H04N 21/4788 |
| 2018/0143980 | A1* | 5/2018 | Tanikella | G06F 16/285 |
| 2018/0165365 | A1* | 6/2018 | Staub | G06Q 30/0631 |
| 2018/0268114 | A1* | 9/2018 | Akkaraju | G06F 21/105 |
| 2018/0270245 | A1* | 9/2018 | Akkaraju | G06F 21/10 |
| 2018/0270294 | A1* | 9/2018 | Akkaraju | H04L 67/62 |
| 2019/0050588 | A1* | 2/2019 | Brew | G06N 20/00 |
| 2019/0057145 | A1* | 2/2019 | Huang | G06N 5/02 |
| 2019/0068636 | A1* | 2/2019 | Wang | G06Q 20/352 |
| 2019/0102374 | A1* | 4/2019 | Tiwari | G06F 40/284 |
| 2019/0163794 | A1* | 5/2019 | Smith | H04L 67/535 |
| 2019/0179956 | A1* | 6/2019 | Krasadakis | G06F 40/35 |
| 2019/0199519 | A1* | 6/2019 | Goyal | G06F 21/6218 |
| 2020/0050758 | A1* | 2/2020 | Fullinwider | H04L 67/025 |
| 2020/0053071 | A1* | 2/2020 | Akkaraju | G06F 21/10 |
| 2020/0065417 | A1* | 2/2020 | Anders | G06F 16/955 |
| 2020/0106876 | A1* | 4/2020 | Keen | H04M 1/72436 |
| 2020/0125639 | A1* | 4/2020 | Doyle | G06F 40/30 |
| 2020/0125928 | A1* | 4/2020 | Doyle | G06V 30/19147 |
| 2020/0126533 | A1* | 4/2020 | Doyle | G10L 15/063 |
| 2020/0162272 | A1 | 5/2020 | Bathen | |
| 2020/0202071 | A1* | 6/2020 | Ghulati | G06Q 50/01 |
| 2020/0202073 | A1* | 6/2020 | Ghulati | G06F 40/279 |
| 2020/0213408 | A1* | 7/2020 | Gao | H04L 67/55 |
| 2020/0259862 | A1* | 8/2020 | Daar | H04L 63/1466 |
| 2020/0314507 | A1* | 10/2020 | Yen | G06T 1/0028 |
| 2020/0327254 | A1* | 10/2020 | Abilash | H04L 9/3218 |
| 2021/0004440 | A1* | 1/2021 | Purnell | G06N 7/01 |
| 2021/0049441 | A1* | 2/2021 | Bronstein | G06N 3/045 |
| 2021/0117814 | A1* | 4/2021 | Flinn | G06N 5/045 |
| 2021/0133487 | A1* | 5/2021 | Bastide | G06F 16/9024 |
| 2021/0150374 | A1* | 5/2021 | Bastide | H04L 51/046 |
| 2021/0165969 | A1* | 6/2021 | Galitsky | G06F 40/30 |
| 2021/0281435 | A1* | 9/2021 | Fox | H04L 51/222 |
| 2022/0045864 | A1* | 2/2022 | Heppe | H04L 9/0643 |
| 2022/0055657 | A1* | 2/2022 | McIntosh | B60W 60/0025 |
| 2022/0078146 | A1* | 3/2022 | Kaur | H04L 51/212 |
| 2022/0103365 | A1* | 3/2022 | Berent | H04L 65/75 |
| 2022/0284069 | A1* | 9/2022 | Kwatra | G06F 16/9536 |
| 2022/0350954 | A1* | 11/2022 | Tumbde | G06V 20/00 |
| 2022/0383289 | A1* | 12/2022 | Aggarwal | G06Q 20/223 |
| 2023/0031178 | A1* | 2/2023 | Panchaksharaiah | |
| | | | | G06Q 20/389 |

OTHER PUBLICATIONS

Anonymously, "Machine Learning to Disable Applications from Using Background Resources Except at Appropriate Times", IPCOM000252088D, Dec. 15, 2017, pp. 1-36.

Anonymously, "Polymorphic Cognitive Identity Assistant", IPCOM000257794D, Mar. 11, 2019, pp. 1-7.

Ashokan, "How India's Premier Engineering Institutes are using AI to Make Social Media a Safe Place", https://analyticsindiamag.com/how-indias-premier-engineering-institutes . . . , Aug. 5, 2018, pp. 1-7.

Factmata, "Try Factmata", https://try.factmata.com/, printed Dec. 28, 2020, pp. 1-5.

Friggeri et al., "Rumor Cascades", Association for the Advancement of Artificial Intelligence, (www.aaai.org), 2014, pp. 1-10.

Gill, et al.; "Transformative Effects of IOT, Blockchain and Artificial Intelligence on Cloud Computing: Evolution, Vision, Trends and Open Challenges", Oct. 19, 2019, pp. 1-30.

Live Mint, "How a Delhi-based Professor is fixing Whats App's Fake News Problem with Machine Learning", https://www.livemint.com/AI/HPD7L1cfXEKILw3Ev3pH30/How-a-De . . . , printed Dec. 23, 2020, pp. 1-5.

Mell et al., "The NIST Definition of Cloud Computing", National Institute of Standards and Technology, Special Publication 800-145, Sep. 2011, pp. 1-7.

(56) References Cited

OTHER PUBLICATIONS

Metafact, "About Us—We're a Blend of Artificial Intelligence & Journalism", http://metafact.org/about.php, printed Dec. 28, 2020, pp. 1-3.
Metafact, "This startup is fighting India's fake news problem on WhatsApp", https://www.fastcompany.com/90445139/this-startup-is-fighting-indias-f . . . , Dec. 22, 2019, pp. 1-9.
Samek et al.; "Explainable Artificial Intelligence: Understanding, Visualizing and Interpreting Deep Learning Models", arXiv:1708.08296v1 [cs.AI], Aug. 28, 2017, pp. 1-8.

* cited by examiner

ENTITY VALIDATION OF A CONTENT ORIGINATOR

BACKGROUND

This disclosure relates generally to entity validation of a content originator, and in particular to validating an entity claiming to be a content originator in a digital public forum.

Social media platforms provide a primary channel of communication across various geographies and user types. Social media platforms have been embraced in the professional setting as a way of directly and rapidly communicating to users, without the utilization of an intermediary party. A global announcement regarding a new product represents is an example of a communication that can be directly and rapidly distributed, where the social media platform provides users the ability to exchange and share these communications with other users. As a communication is released, a number of users viewing the communication grows exponentially as the communication is exchanged and shared by other users, where an intentionally and unintentionally manipulation of the communication can occur as the communication is exchanged and shared with other users.

SUMMARY

Embodiments in accordance with the present invention disclose a method, computer program product and computer system for entity validation of a content originator, the method, computer program product and computer system can identify a content post in a public forum viewable by a user, wherein an entity claims to be an originator of the content post. The method, computer program product and computer system can, responsive to gathering metadata for the content post, determine, utilizing natural language processing and a classification algorithm, a topic for the content post based on a plurality of extracted words from the content post. The method, computer program product and computer system can identify a plurality of similar content posts relative to the content post based on the topic and the entity. The method, computer program product and computer system can determine a score for the entity claiming to be the originator of the content post, wherein the score represents a likelihood that the claimed entity is the originator of the content post. The method, computer program product and computer system can, responsive to the score being below a verification threshold value, perform one or more ameliorative actions on the content post.

DETAILED DESCRIPTION

Embodiments of the present invention provide entity validation of a claimed originator of a content post in a digital public forum. Examples of digital public forums include social media platforms and discussion section on new outlets, where a user can post content viewable by other users in the form of text, audio, images, and/or videos. Instances can occur where a user unintentionally shares a content post with inaccurate and/or false information with other users, where the content post exponentially spreads among the other users as each user shares the content post with another group of other users. Embodiments of the present invention perform an ameliorative action to curb the spread of inaccurate and/or false information based on an analysis of the content post and other similar content posts associated with an entity claiming to be an originator of the content post.

Figure 1:
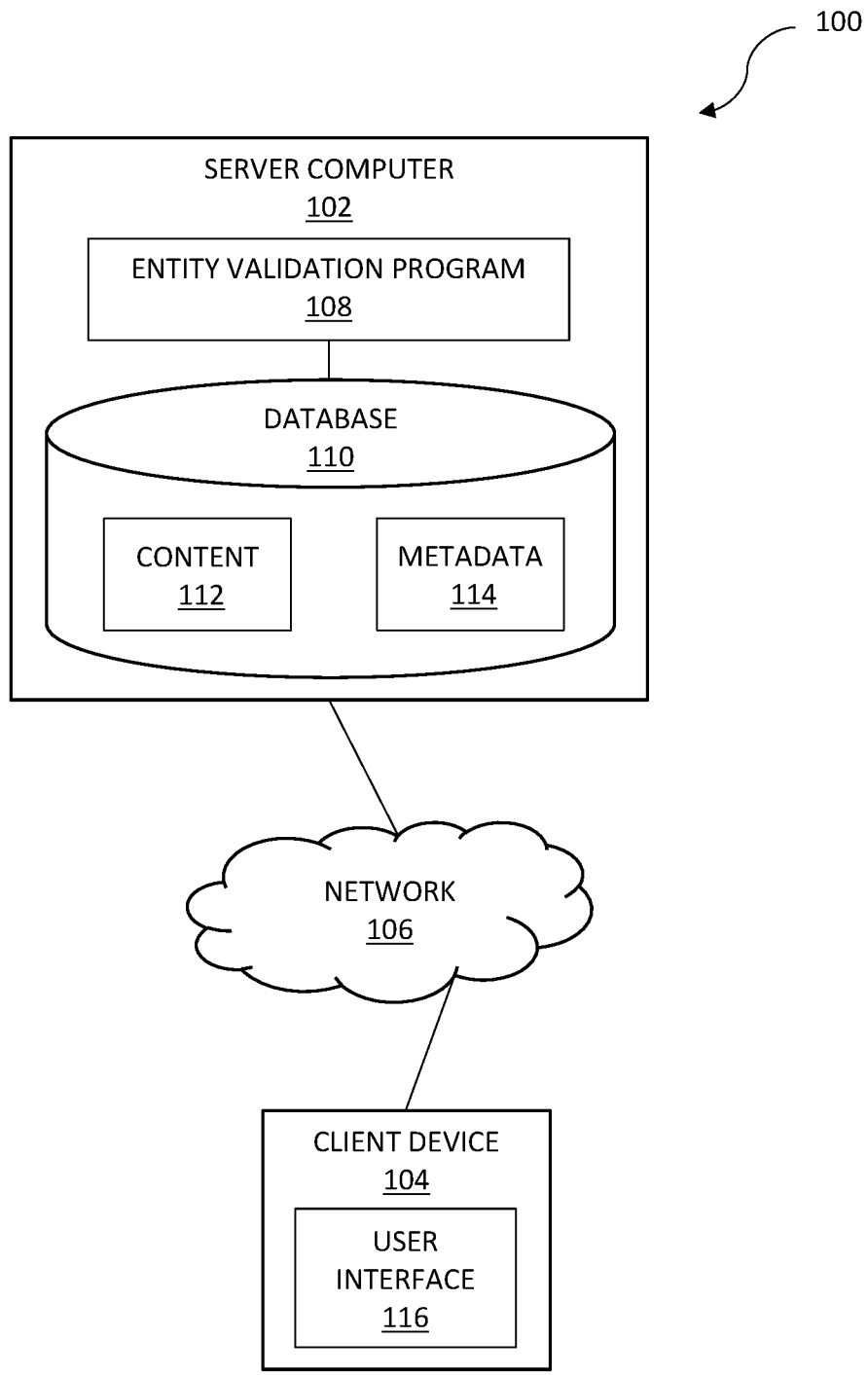
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102 and client device 104, interconnected over network 106. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within the distributed data processing environment. Server computer 102 includes entity validation program 108, and database 110 with content 112 and metadata 114. Server computer 102 may include internal and external hardware components, as depicted and described in further detail with respect to FIG. 4.

Client device 104 can be a laptop computer, a tablet computer, a smart phone, smart watch, a smart speaker, or any programmable electronic device capable of communicating with various components and devices within the distributed data processing environment, via network 106.

Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 106. In one embodiment, client device 104 represents one or more devices associated with a user. Client device 104 includes an instance of user interface 116 for interacting with entity validation program 108 on server computer 102.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between server computer 102 and client device 104, and other computing devices (not shown) within the distributed data processing environment.

Entity validation program 108 provides entity validation of an originator of content, where the content is presented in a public forum (e.g., social media platform). Entity validation program 108 identifies a content post from content 112 originating from an entity in the public forum, where an entity (e.g., user, business) is claiming to be an originator of the content post. Entity validation program 108 classifies the types of data present in the content post and gathers metadata 114 associated with the content data to provide additional context to the content post with respect to the claimed entity. Entity validation program 108 determines a topic for the content post and identifies similar posts relative to the content post, where the similar content is based on content including a similar topic as the determined topic and an entity claiming to be the originator. Entity validation program 108 determines a score for the claimed entity as the originator of the content post utilizing natural language processing techniques and sentiment analysis through natural language toolkit (NLTK) libraries. Entity validation program 108 aggregates rolling baseline of indicators and performs aggregative scoring and index validation to see if the determined score for the claimed entity is within a set range given a standard deviation. Entity validation program 108 performs an action based on the aggregative scoring and index validation, where the action is based on the entity accurately or falsely claiming to be the originator of the content post.

Database 110 is a repository that stores content 112 and metadata 114, where content 112 can include text, audio, images, videos, and other digital content a user can post in a public forum (e.g., social media platform, messaging board). Metadata 114 is associated with content 112 and can include textual tags, time stamps, origin information, location information, a number of views, a number of shares, and any other data can be appended to each content post in content 112. In the depicted embodiment, database 110 resides on server computer 102. In another embodiment, database 110 may reside on client device 104 or elsewhere within the distributed data processing environment provided entity validation program 108 has access to database 110. A database is an organized collection of data. Database 110 can be implemented with any type of storage device capable of storing data and configuration files that can be accessed and utilized by entity validation program 108, such as a database server, a hard disk drive, or a flash memory. Entity validation program 108 has the ability to access content 112 and metadata 114, User interface 116 enables a user to make requests of or issue commands to client device 104 and receive information and instructions in response. In one embodiment, a user of client device 104 accesses user interface 116 via voice commands in natural language. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 116 may also be mobile application software. In an example, mobile application software, or an "app," is a computer program designed to run on smart phones, tablet computers and other mobile devices. User interface 116 enables a user of client device 104 to interact with entity validation program 108 and enables entity validation program 108 to display an action performed on the content post.

Figure 2:
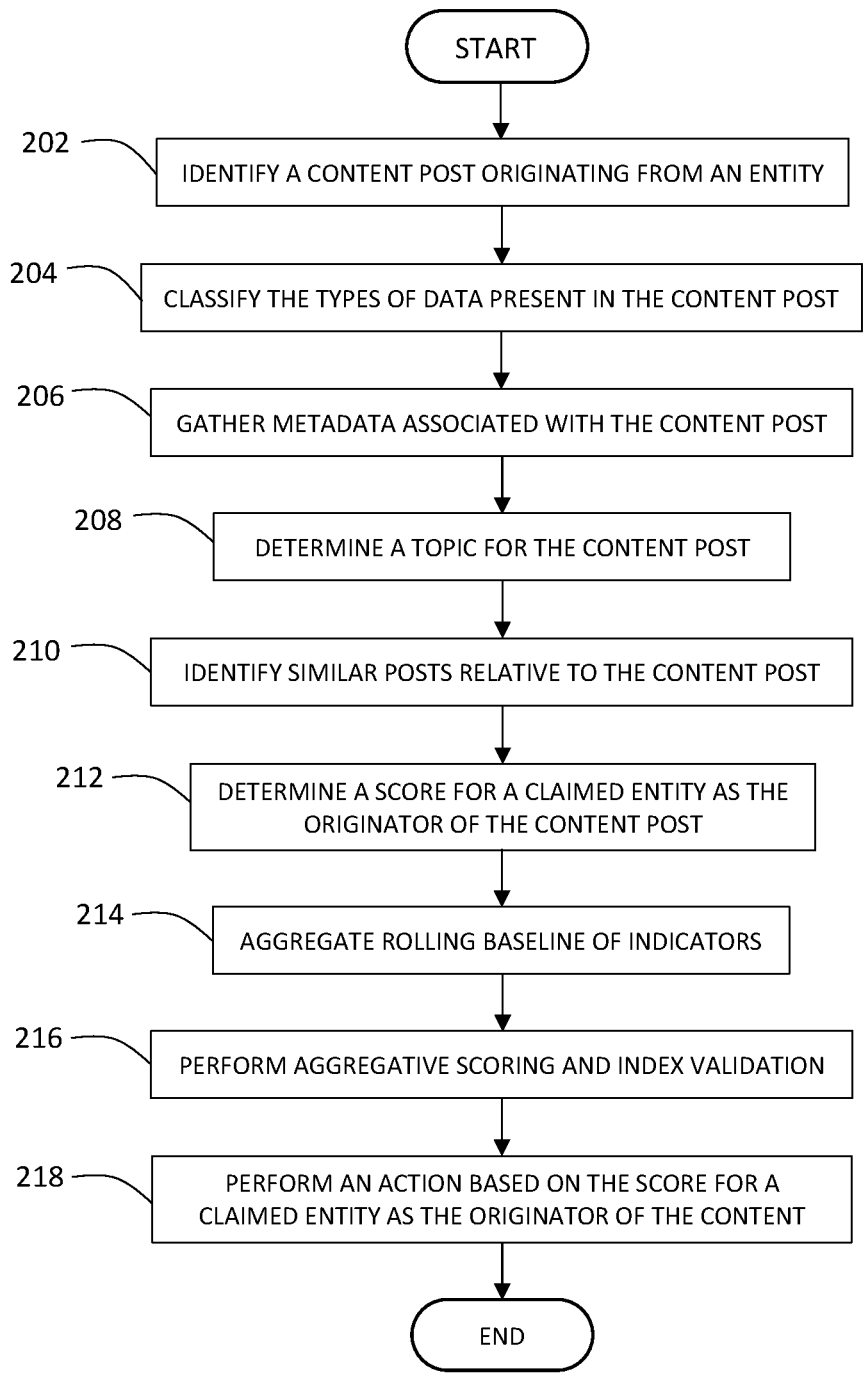
FIG. 2 is a flowchart depicting operational steps of an entity validation program for validating an entity as a content originator, in accordance with an embodiment of the present invention.

FIG. 2 is a flowchart depicting operational steps of an entity validation program for validating an entity as a content originator, in accordance with an embodiment of the present invention.

Entity validation program 108 identifies (202) a content post originating from an entity. An entity represents a user of a public forum capable of distributing information via a content post viewable by other users, where the entity can be an individual person or organization (e.g., company, charity). Entity validation program 108 identifies content posted on the public form originating from the entity, where the entity is claiming to be an originator of the content post. A content post can include text, audio, images, videos, and various other types of data representing digital content a user can post in the public forum that is viewable by other users of the public form. The public forum can include a social media platform, a message platform, a blog, a forum, a comment section, and any other publicly accessible medium where a user can post digital content viewable by other users. In one embodiment, as a user accesses a webpage of a public forum, entity validation program 108 identifies a content post origination from an entity to determine whether the entity claiming to be an originator of the content post is accurate. In another embodiment, as a user views multiple content post on a webpage of a public forum, entity validation program 108 identifies a content post from the multiple content posts by receiving a user input selection of the content post for which the user wants to determine whether the entity claiming to be an originator of the content post is accurate. In yet another embodiment, entity validation program 108 identifies a content post originating from an entity based on one or more of: a number of times the content post is shared between users of the public forum, a number of views of the content post, and a privacy setting on whether the content post is public to all users or a select group of users.

Entity validation program 108 classifies (204) the types of data present in the content post. As previously discussed, the content post can include text, audio, images, videos, and various other types of data representing digital content a user can post in the public forum that is viewable by other users of the public form. Entity validation program 108 classifies the types of data present in the content post to ensure proper analysis is performed on the content post to determine whether the entity claiming to be an originator of the content post is accurate. Entity validation program 108 can utilize a combination of natural language processing and image analysis (e.g., optical character recognition (OCR)) on the various types of data in the content post. For images and videos, further detailed information can be imbedded in an image or video such as a map or a chart, which entity validation program 108 can further classify for proper analysis.

Entity validation program 108 gathers (206) metadata associated with the content post. Metadata provides additional context to the content post with respect to the entity claiming to be the originator and can include textual tags, time stamps, origin information, location information, a number of views, a number of shares, and any other data can be appended to each content post. Textual tags represent user generated letters, digits, and underscores for correlating a content post with a specific topic and enables cross-referencing of content posts sharing a common subject or theme. Time stamps represent a time within a specific time zone when the content post was originally posted by the claimed entity and can further include a time for each instance of an edit that was performed to the content post. Origin information can include hyperlinks and webpage addresses for text, images, and videos embedded in the content post. Location information represents geolocation tag from where the content posted originated and can include a country, a region, a state, a county, a city, a district, a place of business, a landmark, or any other location identifiable information. A number of views represents a number of times the content post was viewed by other users and a number of shares represents a number of times the content post was shared by one user with another user.

Entity validation program 108 determines (208) a topic for the content post. Entity validation program 108 utilizes natural language processing (NLP) and a classification algorithm (e.g., Latent Dirichlet Allocation (LDA)) to understand and determine the topic for the content post. Entity validation program 108 analyzes the various classified types of data (i.e., text, image, and video) and the gathered metadata to determine the topic for content post. Entity validation program 108 can extract words for natural language processing from text, images, and/or videos in the content post and classify the extracted words utilizing the classification algorithm. The classification algorithm is customizable based on the public forum in which the content post is located, where the classification algorithm can utilize broad classification topics (e.g., technology) for general public forum (e.g., social media platforms) and targeted classification topics (e.g., hybrid cloud, Internet of Things) for specific public forums (e.g., comment section on a technology news outlet).

Entity validation program 108 models each content post as a multinomial distribution of topics and each topic is modeled as a multinomial distribution of words, where the LDA assumes the words for each content post are related and the content post comprises a mixture of topics. Entity validation program 108 preprocesses the extracted words through tokenization (i.e., splitting text into individual words), removing words with fewer than a certain number of characters (e.g., 4 characters), lemmatizing the words (i.e., same tense and person perspective), and stemming the words (i.e., reduced to root form). Subsequently, entity validation program 108 converts the preprocessed extracted words to a dictionary listing how many words are present and how many times each of the words appears in the content post. Entity validation program 108 runs the LDA classification algorithm on the dictionary and extracts a topic for the content post, where entity validation program 108 determines the extracted topic utilize the LDA classification algorithm is the topic for the content post.

Entity validation program 108 identifies (210) similar posts relative to the content post. Entity validation program 108 identifies similar posts relative to the content post by scanning the public forum in which the content post was provided for similar posts by the entity claiming to be the originator of the content post. For every similar post, entity validation program 108 identifies similar traits that include, an overall sentiment, a range of topics, sentence construction and grammar patterns, language usage (e.g., English, Spanish), and associated metadata. Entity validation program 108 identifies an overall sentiment for each similar post by performing sentiment analysis through natural language processing to determine whether each similar content post includes an overall sentiment that is positive, negative, or neutral. Entity validation program 108 identifies the range of topics for each similar post based on techniques discussed above with regards to determining (208) a topic for the content post. The techniques include entity validation program 108 utilizes natural language processing (NLP) and a classification algorithm (e.g., Latent Dirichlet Allocation (LDA)) to understand and determine the topic for each similar post. Entity validation program 108 identifies sentence constructions and grammar patterns utilizing natural language process on the words extracted from the text, images, and/or videos provided in each similar post. Entity validation program 108 identifies metadata associated with each similar post, where metadata provides additional context to each of the similar posts. The metadata can include textual tags, time stamps, origin information, location information, a number of views, a number of shares, and any other data can be appended to each content post Entity validation program 108 determines (212) a score for a claimed entity as the originator of the content post. Entity validation program 108 determines the score for the claimed entity as the originator of the content post utilizing natural language processing techniques and sentiment analysis through natural language toolkit (NLTK) libraries, where the score represents a likelihood that the claimed entity is the originator of the content post. In one example, entity validation program 108 identifies a content post originating from entity A who is employed by Company A according to a bio on a social media platform with the identified content post. Entity validation program 108 classifies the types of data in the content post as including text and an image, where the image is hyperlinked to another website. Entity validation program 108 gathers metadata associated with the content post that includes a location tag of Sydney, Australia, origin information with a hyperlink to website AB for the image, and a time stamp with a European time zone. Entity validation program 108 determines a topic for the content post as relating to Company B and identifies similar posts relative to the content post. Entity validation program 108 determines a score for the claimed entity A employed by company A as the originator of the content post, where the score represents a likelihood that the claimed entity A employed by company A is in fact the originator of the content post.

Entity validation program 108 compares the location tag of Sydney, Australia for the content post to other location tags of similar content posts and determines that the other location tags are located within North America. Entity validation program 108 marks this discrepancy in the metadata for adjusting the score lower for the claimed entity A as the originator of the content post. Entity validation program 108 compares the origin information with the hyperlink to website AB for the image to other origin information of similar content posts and determined that the other origin information never referenced (i.e., linked or hyperlinked) website AB. Entity validation program 108 marks this discrepancy in the metadata for adjusting the score lower for the claimed entity A as the originator of the content post. Entity validation program 108 compares a time stamp with a European time zone to the location tag of Sydney, Australia and to other time stamps of similar content posts and determines a discrepancy is present between the time stamp and the location tag for the content post. Entity validation program 108 marks this discrepancy in the metadata for adjusting the score lower for the claimed entity. Entity validation program 108 further analyzes the text of the content post and determines a negative sentiment towards Company B. Based on the identified similar posts, Entity validation program 108 determines entity A employed by Company A never displayed negative sentiment towards another company (e.g., Company B). Entity validation program 108 marks this discrepancy in the metadata for adjusting the score lower for the claimed entity. Based on the comparison and analysis, Entity validation program 108 determines a score for the claimed entity A employed by Company A as the originator of the content post, where the score falls below a verification threshold value.

In another example, entity validation program 108 identifies a content post originating from entity A and classifies the types of data in the content post as including text detailing a global announcement of a planned collaboration between Company A and Company B. Entity validation program 108 gathers metadata associated with the content post that includes a location tag of Palo Alto, Calif., a time stamp with a Pacific Standard Time (PST) time zone, and a textual tags identifying Company A and Company B. Entity validation program 108 determines a topic for the content post as relating to the global announcement of the planned collaboration between Company A and Company B and identifies similar posts relative to the content post. Entity validation program 108 determines a score for the claimed entity A as the originator of the content post, where the score represents a likelihood that the claimed entity A is in fact the originator of the content post. In this example, an originator of the content post is a user who is authorized to provide global announcement for Company A and/or Company B.

Entity validation program 108 compares the location tag of Palo Alto, Calif. for the content post to other location tags of similar content posts and determines that the other location tags are also located in Palo Alto, Calif. Entity validation program 108 marks this consistency in the metadata for adjusting the score higher for the claimed entity A as the originator of the content post. Entity validation program 108 compares a time stamp with a Pacific Standard Time (PST) to the location tag of Palo Alto, Calif. and to other time stamps of similar content posts and determines a consistency is present between the time stamp and the location tag for the content post. Entity validation program 108 marks this consistency in the metadata for adjusting the score higher for the claimed entity A. Entity validation program 108 compares the textual tags identifying Company A and Company B to textual tags of other similar content posts that include similar textual tags. Entity validation program 108 marks this consistency in the metadata for adjusting the score higher for the claimed entity A as the originator of the content post. Based on the similar posts, entity validation program 108 determines that global announcements for Company A or Company B originated from either entity B or entity C, rather than entity A. Therefore, Entity validation program 108 marks a discrepancy for adjusting the score lower for the claimed entity A, since entity A might not be authorized to provide global announcement for Company A and/or Company B. Based on the comparison and analysis, Entity validation program 108 determines a score for the claimed entity A as the originator of the content post, where the score is above a verification threshold value. However, since entity B or entity C have typically provided global announcements for Company A or company B, entity validation program 108 performs an action to signal this discrepancy to users viewing the content post, discussed in further detail with regards to (218).

In yet another example, entity validation program 108 identifies a content post originating from entity A and classifies the types of data in the content post as including text and an image regarding an ongoing issue at Company A. Entity validation program 108 gathers metadata associated with the content post that includes a location tag of London, United Kingdom and number of textual tags. Entity validation program 108 determines a topic for the content post as relating to ongoing issue at Company A regarding supply chain issues and identifies similar posts relative to the content post and entity A. Entity validation program 108 determines a score for the claimed entity A as the originator of the content post, where the score represents a likelihood that the claimed entity A is in fact the originator of the content post. In this example, an originator of the content post is a user who provided comments present in the image of the content post.

Entity validation program 108 compares the location tag of London, United Kingdom for the content post to other location tags of similar content posts and determines that the other location tags are also located in London, United Kingdom. Entity validation program 108 marks this consistency in the metadata for adjusting the score higher for the claimed entity A as the originator of the content post. Entity validation program 108 compares the textual tags of the content post to textual tags of other similar content posts and entity validation program 108 determines a discrepancy in the textual tags, since the textual tags for the content post include adjectives with negative sentiment and the textual tags for similar content posts do not include adjectives and only nouns. Entity validation program 108 marks this discrepancy in the metadata for adjusting the score lower for the claimed entity A as the originator of the content post. Additionally, entity validation program 108 performs NLP on the text present in the image of the content post and the textual tags to determine a negative sentiment is present in the language, where it is implied that a specific user provided the negative sentiment present in the image of the content post. Entity validation program 108 compares the negative sentiment present in the language to previous sentiment for the specific user and determines a discrepancy between the sentiments in the similar posts and the negative sentiment in the content post. Entity validation program 108 marks this discrepancy in the sentiment analysis of the language for adjusting the score lower for the claimed entity A as the originator of the content post. Based on the comparison and analysis, Entity validation program 108 determines a score for the claimed entity A as the originator of the content post, where the score is below a verification threshold value.

Entity validation program 108 aggregates (214) a rolling baseline of indicators. Entity validation program 108 can establish an iterative model to update a rolling baseline for an overall sentiment, a range of topics, sentence construction and grammar patterns, language usage, and associated metadata. By combining the different variables, entity validation program 108 can aggregate scoring of specific values of interest. Subsequent to entity validation program 108 authenticating and validating the entity as the originator of content, the baseline can trend and/or migrate through an evolution over time of an aggregated mean. In one example, an entity can experience a shift in viewpoints, sentences structures, and grammar usage over time, thus resulting in a higher aggregate score of specific values. The entity, which can be an organization (e.g., company A) that posts content on a social media platform can shift, from Person A originally posting content to Person B now posting content. Since, Person B can utilize sentence structures and grammar patterns substantially different from Person A, entity validation program 108 aggregates the rolling baseline of indicators to compensate for the shift in the sentence structures and grammar patterns over time. In another example, an entity can experience a decrease in a frequency of content being posted, where the entity went from posting content daily to weekly. Entity validation program 108 aggregates the rolling baseline of indicators to compensate for the shift in frequency of content being posted by frequency, Entity validation program 108 performs (216) aggregative scoring and index validation. Entity validation program 108 utilizes discriminate analysis and clustering analysis to establish a potential spectrum of positive to negative aggregative scoring for a topic, thread, or group. Based on an outcome of the potential spectrum of positive to negative aggregative scoring and indexing of values, entity validation program 108 determines where a new value is placed within a matrix of the indexed values. Subsequently, entity validation program 108 determines a correlation between the new value and the matrix with the indexed values to determine if the new value falls with a standard deviation of the matrix.

Entity validation program 108 performs (218) an action based on the score for the claimed entity as the originator of the content post. Entity validation program 108 performs an ameliorative action with regards to the content post based on the score for the claimed entity as the originator of the content post being below, above, or equal to a verification threshold value. In the event entity validation program 108 previously determined the score for the claimed entity as the originator of the content post to be above the verification threshold value, entity validation program 108 can display the content post to a user without additional actions. Alternatively, entity validation program 108 can display the content post to a user with a symbol (e.g., check mark, positive sentiment emoji) indicating a verified claimed entity as the originator of the content post, a color coded (e.g., green) highlighting border around the content post, and/or a color coded (e.g., green) determined score indicating a verified claimed entity as the originator of the content post.

In the event entity validation program 108 previously determined the score for the claimed entity as the originator of the content post to be above the verification threshold value, entity validation program 108 can display a warning overlay on the content post indicating a failure to verify the claimed entity as the originator of the content post, where the content post is not visible to the user due to the warning overlay. Alternatively, In the event entity validation program 108 previously determined the score for the claimed entity as the originator of the content post to be above the verification threshold value, entity validation program 108 can display the content post with a symbol (e.g., 'X' mark, negative sentiment emoji) indicating a failure to verify the claimed entity as the originator of the content post, and/or a color coded (e.g., red) determined score indicating a failure to verify the claimed entity as the originator of the content post, a color coded (e.g., red) highlighting border around the content post. Entity validation program 108 can also prevent a user from sharing the content post as a new content post and/or by forwarding the content post to other users, by removing the option from the content post and displaying a warning as to why the option was removed. Entity validation program 108 can also prevent the user from sharing the content post by the content post only being visible on a webpage associated with the user (i.e., profile page) to the user and not the other users viewing the webpages associated with the user.

Entity validation program 108 can further perform the action of including a selectable symbol for an expandable window, where entity validation program 108 details reasons on why the content post includes a verified claimed entity or why a failure occurred to verify the claimed entity of the content post. From a previous example discussed in (212), where entity validation program 108 determines a score for the claimed entity A employed by Company A as the originator of the content post falls below a verification threshold value, entity validation program 108 details the discrepancy between the location tag, the origin information, and time stamp for the content post. From another previous example discussed in (212), where entity validation program 108 determines a score for the claimed entity A as being above a verification threshold value, entity validation program 108 details the consistency between the location tag, the time stamp, and the textual tags. However, entity validation program 108 further details how entity B and entity C (rather than entity A) have typically provided global announcements for Company A or company B and to proceed with caution with regards to the content post. From yet another previous example discussed in (212), where entity validation program 108 determines a score for the claimed entity A as the originator of the content post falls below a verification threshold value, entity validation program 108 details the discrepancy between the location tag and the textual tags. However, entity validation program 108 further details the discrepancy between the negative sentiment in the content post and sentiment in similar content posts by the same claimed entity A.

Figure 3:
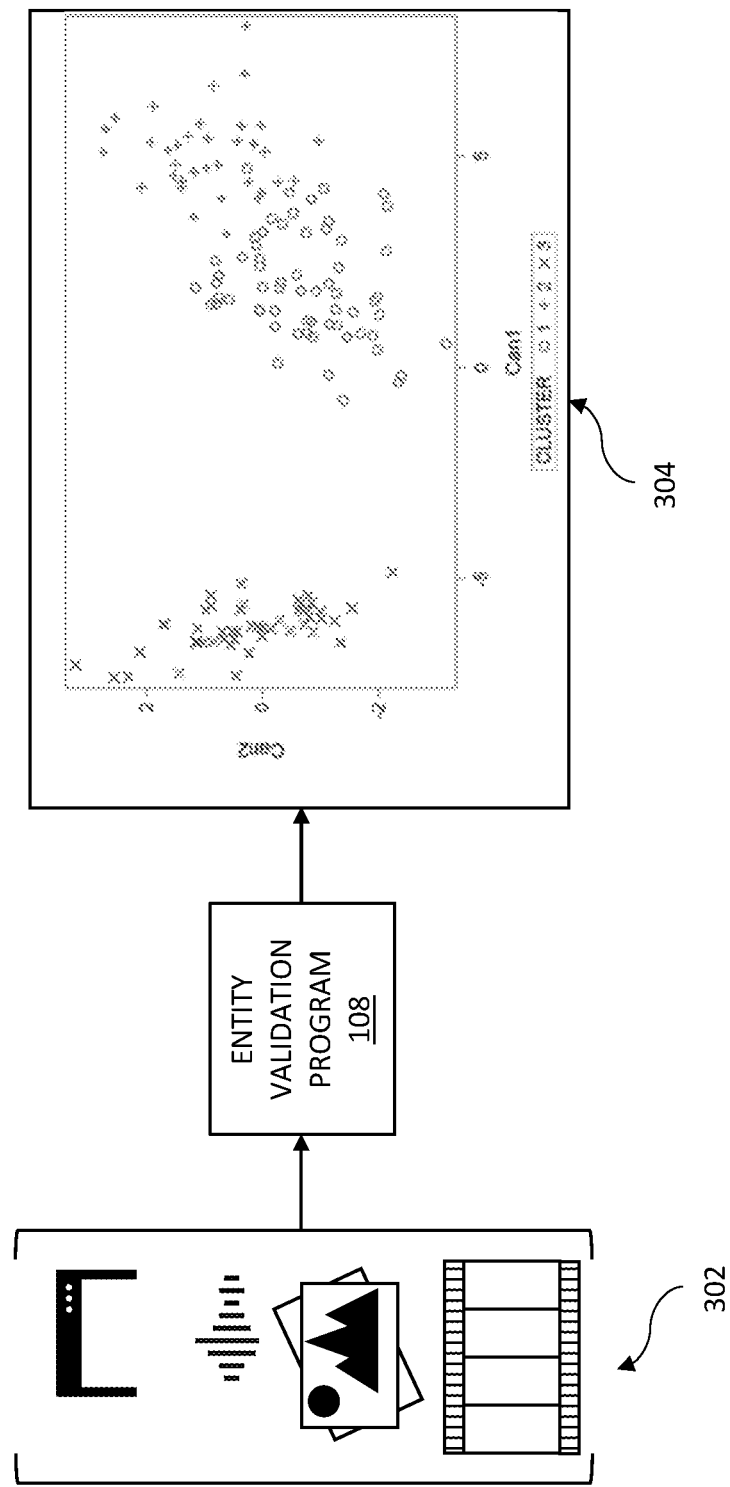
FIG. 3 illustrates an example of an entity validation program generating a cluster diagram based on aggregate scoring and index validation, in accordance with an embodiment of the present invention.

FIG. 3 illustrates an example of an entity validation program generating a cluster diagram based on aggregate scoring and index validation, in accordance with an embodiment of the present invention.

As entity validation program 108 identifies various content posts for verifying an entity as an originator of each content post from the various content posts, entity validation program 108 classifies the various data types 302 that can include text (e.g., comments, status updates), audio, images, and videos. Entity validation program 108 gathers metadata associated with the content data to provide additional context to the content post with respect to the claimed entity and determines a topic for the content post and identifies similar posts relative to the content post, where the similar content is based on content including a similar topic as the determined topic and an entity claiming to be the originator. Entity validation program 108 determines a score for the claimed entity as the originator of the content post utilizing natural language processing techniques and sentiment analysis through natural language toolkit (NLTK) libraries and performs an action based on the determined score. However, entity validation program 108 aggregates rolling baseline of indicators through multiple iterations and performs aggregative scoring and index validation to see if the determined score for the claimed entity is within a set range given a standard deviation. Clustering diagram 304 illustrates the aggregative score for the topic/thread/group, where 'o' represents original baseline values for past aggregative scoring, '+' represents aggregative positive score values, and '−' represents aggregative negative score values. Based on an outcome of the aggregative scoring indexing values, entity validation program 108 determines where a score falls within the cluster of values and whether the score falls within a specified range given a standard deviation for the cluster of values.

Figure 4:
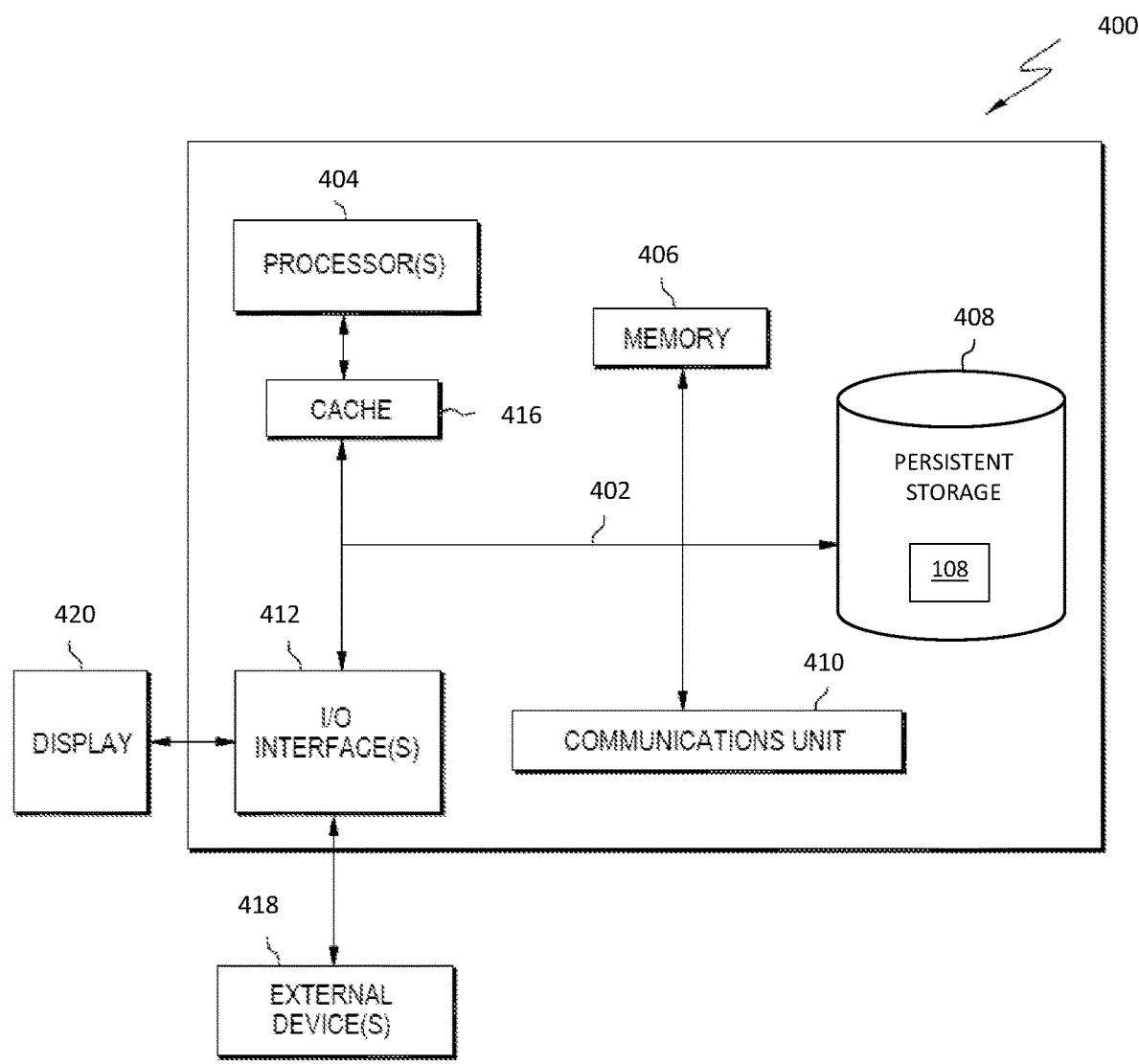
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes entity validation program 108. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
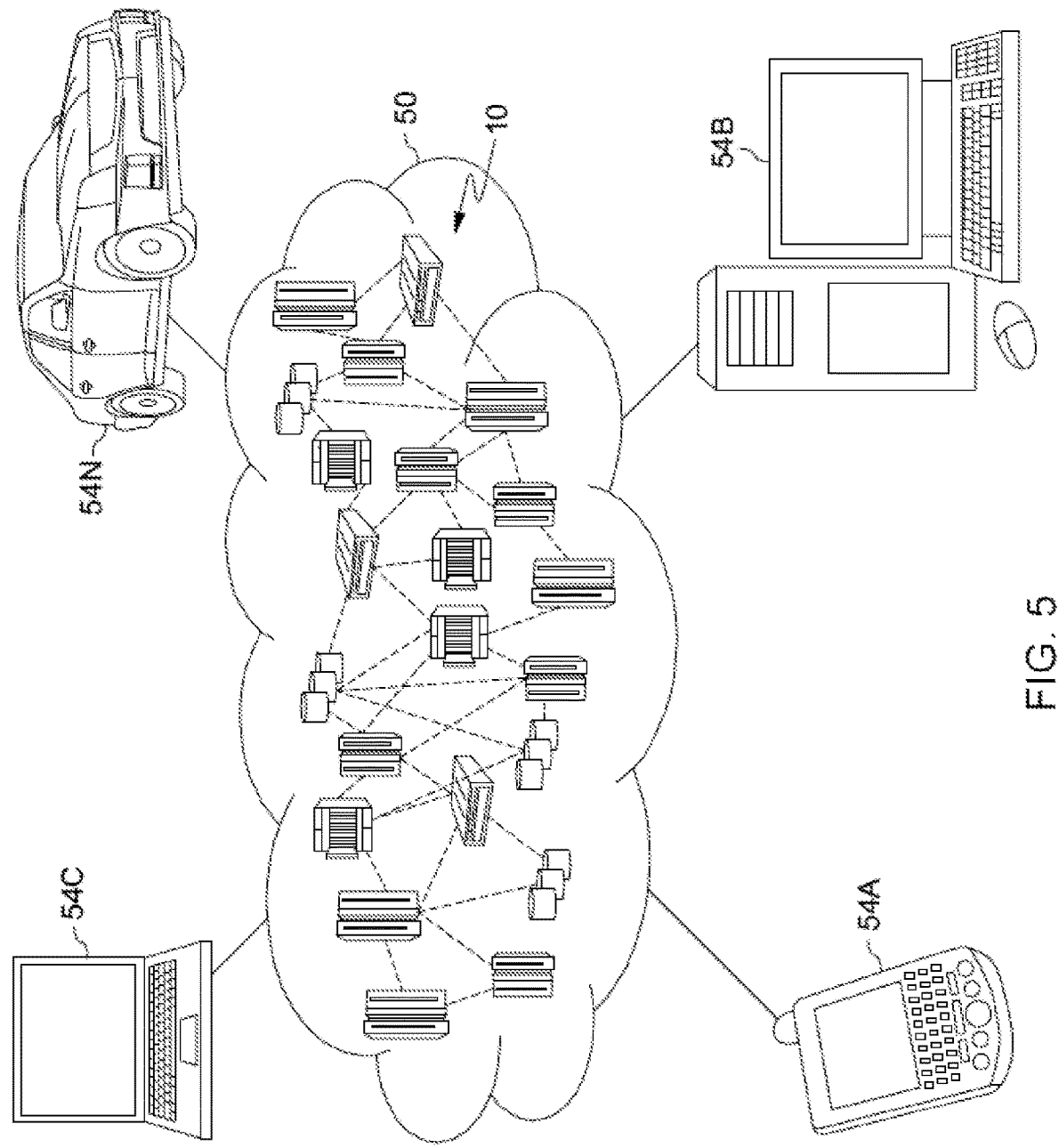
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
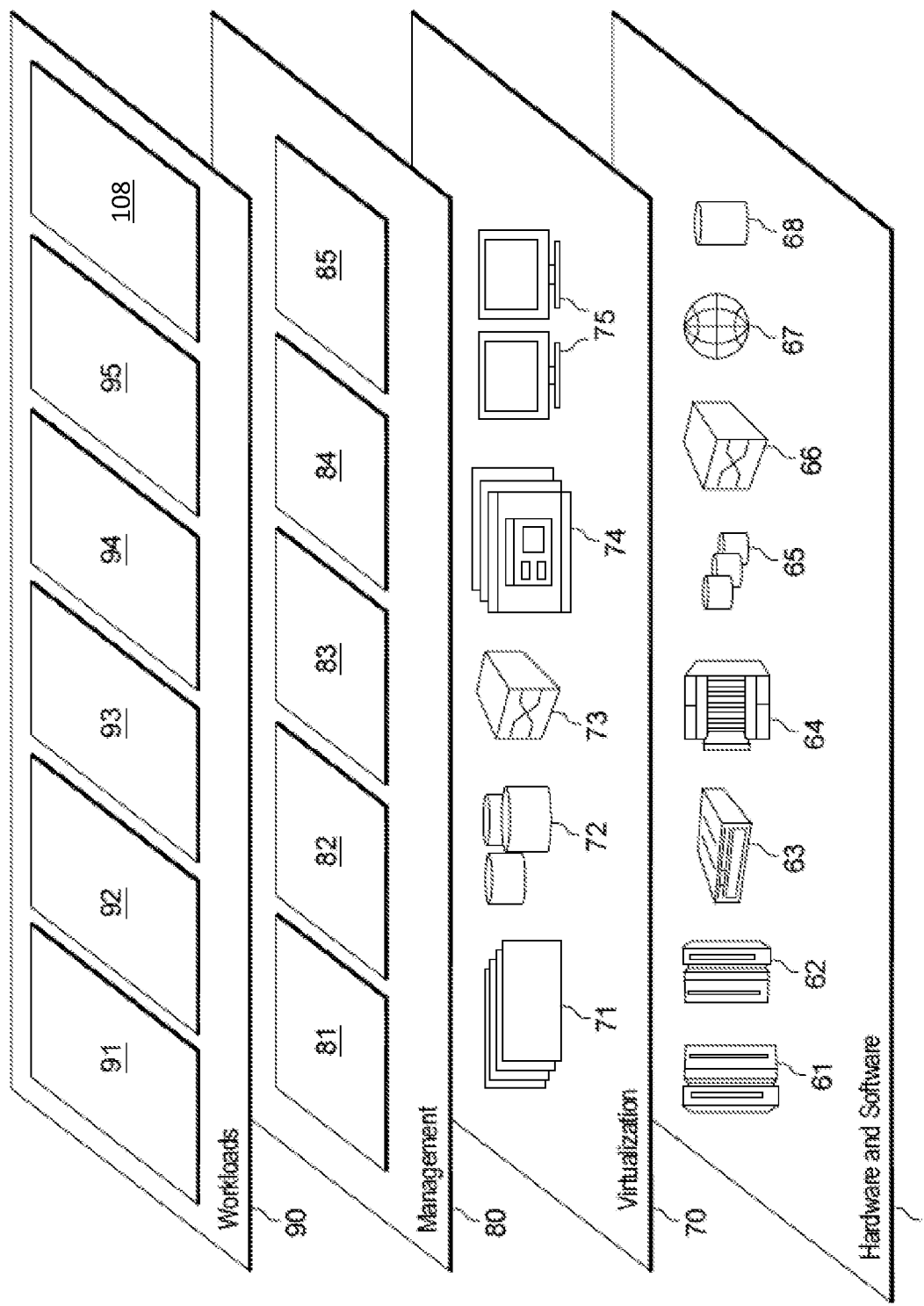
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and entity validation program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
identifying a content post in a public forum viewable by a plurality of users, wherein an entity representing a user of the public forum claims to be an originator of the content post;

responsive to gathering metadata for the content post, determining, utilizing natural language processing and a classification algorithm, a topic for the content post based on a plurality of extracted words from the content post;

identifying a plurality of similar content posts relative to the content post based on the topic and the entity, wherein the entity representing the user of the public forum claims to be the originator of the plurality of similar content posts;

determining a score for the entity claiming to be the originator of the content post that represents a likelihood that the entity is the originator of the content post based on a comparison of the metadata for the content post to associated metadata for the plurality of similar content posts, wherein the score being below a verification threshold indicates the entity is not the originator of the content post and the score being at or above the verification threshold indicates the entity is the originator of the content;

determining the score is below the verification threshold value indicating the entity is not the originator of the content post;

responsive to determining the score is below the verification threshold value, establishing an iterative model to update a rolling baseline for an overall sentiment, the topic, sentence structure and grammar patterns, language usage, and the associated metadata for the plurality of similar content posts, wherein the iterative model is utilized for determining a subsequent score fora subsequent entity claiming to be the originator of a subsequent content post on the topic; and performing one or more ameliorative actions on the content post, wherein the one or more ameliorative actions indicate to the plurality of the users viewing the content post in the public forum that the entity representing the user of the public forum that claims to be the originator was not verified.

2. The computer-implemented method of claim 1, further comprising:
classifying one or more types of data present in the content post, wherein the one or more types of data is selected from a group consisting of text, audio, image, and video.

3. The computer-implemented method of claim 1, further comprising:
gathering the metadata for the content post, wherein the metadata is selected from a group consisting of: textual tags, time stamps, origin information, location information, a number of views, and a number of shares.

4. The computer-implemented method of claim 1, wherein identifying the plurality of similar content posts further comprises:
scanning the public forum in which the content post was provided for the plurality of similar posts by the entity claiming to be the originator of the content post; and
identifying the similar posts based on one or more similar traits selected from a group consisting of: an overall sentiment, a range of topics, sentence construction and grammar patterns, language usage, and associated metadata.

5. The computer-implemented method of claim 1, wherein performing the one or more ameliorative actions on the content post further comprises:
removing an option to share the content post by the plurality of users of the public forum; and
displaying, to the plurality of users, the content post with a symbol indicating a failure to verify the entity as the originator of the content post.

6. The computer-implemented method of claim 1, wherein performing the one or more ameliorative actions on the content post further comprises:
removing an option to share the content post by the plurality of users of the public forum; and
displaying, to the plurality of users, a selectable symbol for an expandable window, wherein the expandable window lists one or more reasons for a failure to verify the entity as the originator of the content post.

7. A computer program product comprising one or more computer readable storage media and program instructions collectively stored on the one or more computer readable storage media, the stored program instructions executable by one or more computer processors, the stored program instructions comprising:
program instructions to identify a content post in a public forum viewable by a plurality of users, wherein an entity representing a user of the public forum claims to be an originator of the content post;
program instructions to, responsive to gathering metadata for the content post, determine utilizing natural language processing and a classification algorithm, a topic for the content post based on a plurality of extracted words from the content post;
program instructions to identify a plurality of similar content posts relative to the content post based on the topic and the entity, wherein the entity representing the user of the public forum claims to be the originator of the plurality of similar content posts;
program instructions to determine a score for the entity claiming to be the originator of the content post that represents a likelihood that the entity is the originator of the content post based on a comparison of the metadata for the content post to associated metadata for the plurality of similar content posts, wherein the score being below a verification threshold indicates the entity is not the originator of the content post and the score being at or above the verification threshold indicates the entity is the originator of the content;
program instructions to determine the score is below the verification threshold value indicating the entity is not the originator of the content post;
program instructions to, responsive to determining the score is below the verification threshold value, establish an iterative model to update a rolling baseline for an overall sentiment, the topic, sentence structure and grammar patterns, language usage, and the associated metadata for the plurality of similar content posts, wherein the iterative model is utilized for determining a subsequent score fora subsequent entity claiming to be the originator of a subsequent content post on the topic; and
program instructions to perform one or more ameliorative actions on the content post, wherein the one or more ameliorative actions indicate to the plurality of the users viewing the content post in the public forum that the entity representing the user of the public forum that claims to be the originator was not verified.

8. The computer program product of claim 7, the stored program instructions further comprising:
program instructions to classify one or more types of data present in the content post, wherein the one or more types of data is selected from a group consisting of text, audio, image, and video.

9. The computer program product of claim 7, the stored program instructions further comprising:
   program instructions to gather the metadata for the content post, wherein the metadata is selected from a group consisting of: textual tags, time stamps, origin information, location information, a number of views, and a number of shares.

10. The computer program product of claim 7, wherein identifying the plurality of similar content posts, the stored program instructions further comprises:
   program instructions to scan the public forum in which the content post was provided for the plurality of similar posts by the entity claiming to be the originator of the content post; and
   program instructions to identify the similar posts based on one or more similar traits selected from a group consisting of: an overall sentiment, a range of topics, sentence construction and grammar patterns, language usage, and associated metadata.

11. The computer program product of claim 7, wherein performing the one or more ameliorative actions on the content post, the stored program instructions further comprises:
   program instructions to remove an option to share the content post by the plurality of users of the public forum; and
   program instruction to display, to the plurality of users, the content post with a symbol indicating a failure to verify the entity as the originator of the content post.

12. The computer program product of claim 7, wherein performing the one or more ameliorative actions on the content post, the stored program instructions further comprises:
   program instructions to remove an option to share the content post by the plurality of users of the public forum; and
   program instructions to display to the plurality of users, a selectable symbol for an expandable window, wherein the expandable window lists one or more reasons for a failure to verify the entity as the originator of the content post.

13. A computer system comprising:
   one or more computer processors;
   one or more computer readable storage media; and
   program instructions stored on the computer readable storage media for execution by at least one of the one or more computer processors, the program instructions comprising:
   program instructions to identify a content post in a public forum viewable by a plurality of users, wherein an entity representing a user of the public forum claims to be an originator of the content post;
   program instructions to, responsive to gathering metadata for the content post, determine utilizing natural language processing and a classification algorithm, a topic for the content post based on a plurality of extracted words from the content post;
   program instructions to identify a plurality of similar content posts relative to the content post based on the topic and the entity, wherein the entity representing the user of the public forum claims to be the originator of the plurality of similar content posts;
   program instructions to determine a score for the entity claiming to be the originator of the content post that represents a likelihood that the entity is the originator of the content post based on a comparison of the metadata for the content post to associated metadata for the plurality of similar content posts, wherein the score being below a verification threshold indicates the entity is not the originator of the content post and the score being at or above the verification threshold indicates the entity is the originator of the content;
   program instructions to determine the score is below the verification threshold value indicating the entity is not the originator of the content post;
   program instructions to, responsive to determining the score is below the verification threshold value, establish an iterative model to update a rolling baseline for an overall sentiment, the topic, sentence structure and grammar patterns, language usage, and the associated metadata for the plurality of similar content posts, wherein the iterative model is utilized for determining a subsequent score for a subsequent entity claiming to be the originator of a subsequent content post on the topic; and
   program instructions to perform one or more ameliorative actions on the content post, wherein the one or more ameliorative actions indicate to the plurality of the users viewing the content post in the public forum that the entity representing the user of the public forum that claims to be the originator was not verified.

14. The computer system of claim 13, the stored program instructions further comprising:
   program instructions to classify one or more types of data present in the content post, wherein the one or more types of data is selected from a group consisting of text, audio, image, and video.

15. The computer system of claim 13, the stored program instructions further comprising:
   program instructions to gather the metadata for the content post, wherein the metadata is selected from a group consisting of: textual tags, time stamps, origin information, location information, a number of views, and a number of shares.

16. The computer system of claim 13, wherein identifying the plurality of similar content posts, the stored program instructions further comprises:
   program instructions to scan the public forum in which the content post was provided for the plurality of similar posts by the entity claiming to be the originator of the content post; and
   program instructions to identify the similar posts based on one or more similar traits selected from a group consisting of: an overall sentiment, a range of topics, sentence construction and grammar patterns, language usage, and associated metadata.

17. The computer system of claim 13, wherein performing the one or more ameliorative actions on the content post, the stored program instructions further comprises:
   program instructions to remove an option to share the content post by the plurality of users of the public forum; and
   program instruction to display, to the plurality of users, the content post with a symbol indicating a failure to verify the entity as the originator of the content post.

18. The computer system of claim 13, wherein performing the one or more ameliorative actions on the content post, the stored program instructions further comprises:
   program instructions to remove an option to share the content post by the plurality of users of the public forum; and program instructions to display to the plurality of users, a selectable symbol for an expandable window, wherein the expandable window lists one or more reasons for a failure to verify the entity as the originator of the content post.

* * * * *